(No Model.)

J. D. WINTERS.
SELF CLEARING REVOLVING BEAM HARROW.

No. 303,780. Patented Aug. 19, 1884.

WITNESSES:
Chas. Nida
B. F. Underwood.

INVENTOR:
J. D. Winters
BY Munn & Co
ATTORNEYS.

UNITED STATES PATENT OFFICE.

JOHN D. WINTERS, OF DAVISVILLE, CALIFORNIA.

SELF-CLEARING REVOLVING-BEAM HARROW.

SPECIFICATION forming part of Letters Patent No. 303,780, dated August 19, 1884.

Application filed December 26, 1883. (No model.)

*To all whom it may concern:*

Be it known that I, JOHN D. WINTERS, of Davisville, in the county of Yolo and State of California, have invented a new and useful Improvement in Self-Clearing Revolving-Beam Harrows, of which the following is a full, clear, and exact description.

Reference is to be had to the accompanying drawings, forming a part of this specification, in which similar letters of reference indicate corresponding parts in all the figures.

Figure 1:
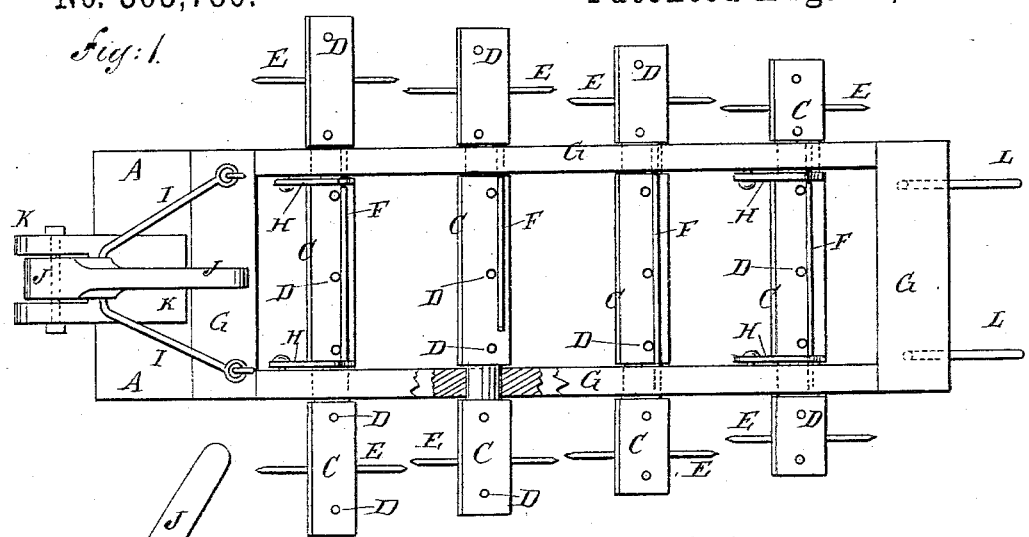
Figure 2:
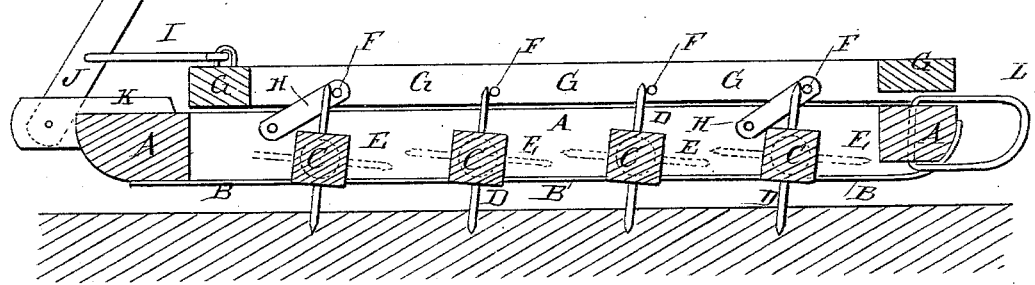
Figure 3:
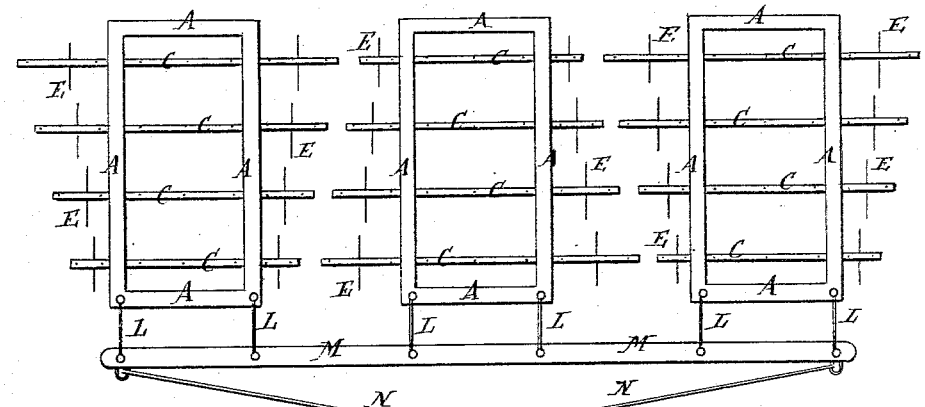

Figure 1 is a plan view of a section of my improved harrow, part being broken away. Fig. 2 is a sectional side elevation of the same. Fig. 3 is a plan view of a completed harrow.

The object of this invention is to provide harrows constructed in such a manner that they can be readily made to clear themselves of rubbish while at work.

The invention consists in a harrow constructed with a lower frame provided with rotating beams having teeth upon their opposite sides and having cross-rods at right angles with the teeth, and an upper frame provided with cross-bars and connected with the lower frame by hinged bars and a bail and lever, whereby the tooth-beams can be allowed to rotate to clear the teeth of rubbish, as will be hereinafter fully described.

A represents the main frame of the harrow, which is formed of two side bars connected at their ends by cross-bars. The lower sides of the ends of the frame A are rounded or beveled, as shown in Fig. 2, to prevent the said ends from catching upon the ground. The lower edges of the side bars of the frame A are faced with metal plates B to prevent wear.

C are the tooth-beams, the journals of which revolve in bearings in the lower parts of the side bars of the frame A, where they are kept in place by the facing-plates B.

D are the teeth, which are sharpened at both ends, pass through the beams C, and are secured in the said beams with both ends projecting equally. The successive beams C gradually increase in length from one end of the frame A to the other.

To the end parts of the tooth-beams C, and at right angles with the teeth D, are attached cross bars or rods E, of the same length as the said teeth, to engage with the soil and rotate the beams C. The upper ends of the teeth D rest against cross-bars F, attached to the side bars of the frame G, to support the said teeth against the resistance of the soil and prevent the beams C from turning. The frame G, when the harrow is at work, rests upon the frame A, as shown in Fig. 2, and is connected with the said frame A by short inclined bars H, the upper ends of which are pivoted to the side bars of the frame G by the cross-bars F, or other suitable means, and their lower ends are pivoted to the side bars of the frame A.

To the end parts of the rear cross-bar of the frame G are pivoted the ends of a bail, I, the middle part of which is hinged to the lever J at a little distance from its lower end. The lower end of the lever J is hinged to a support, K, attached to the rear cross-bar of the frame A, so that by operating the said lever J the frame G will be moved longitudinally, bringing the inclined bars H into a vertical position, raising the frame G away from the frame A, raising the cross-bars F away from the ends of the teeth D, and allowing the beams C to be turned through a quarter of a revolution by the resistance of the soil against the lower ends of the said teeth. This quarter-revolution of the beams C brings the ends of the rods E in contact with the soil, and the said beams are made to revolve through another quarter of a revolution. As the beams C begin to revolve the frame G is lowered into place upon the frame A, so that when the said beams C have completed a half-revolution the ends of the teeth D will strike against the cross-bars F and the revolution of the beams C will be stopped with the teeth D again in working position, but with their other ends downward. This half-revolution of the tooth-beams C allows the teeth D to clear themselves of any rubbish that may have caught upon them.

To the forward cross-bar of the frame A are attached links or clevises L, to which the draft is applied when a single section is to be used. When a large harrow is required, two or more sections are used, and the links or clevises L of the several sections are attached to a long draft-bar, M, the sections being arranged with the long tooth-beams of one section and the short tooth-beams of the next section forward successively, as shown in Fig. 3.

To the end parts of the draft-bar M are attached the ends of a bail or jointed draw-rod, N, to the center or central joint of which is coupled the center of the double-tree O, which is provided with whiffletrees P, in the ordinary manner, so that the harrow will be drawn forward squarely.

I am aware that it is not broadly new to provide harrows with a pivoted bar and lever above the harrow and devices pivoted thereto and to the harrow-frame for engaging projections on the rotary toothed beams of the harrow to prevent rotation thereof until said pivoted bar is raised by the lever, and I do not claim such construction of self-clearing harrow, broadly, as of my invention.

Having thus described my invention, I claim as new and desire to secure by Letters Patent—

The combination of the frame A and rotary beams C, provided with teeth and rods D E, with the frame G, above the frame A, and connected thereto by the links H, pivoted to the opposite side bars of the two frames, cross-rods F, extending across the frame G, for preventing the teeth from turning, and a lever, J, pivoted to frame A and connected to frame G by a bail, I, substantially as set forth.

JOHN D. WINTERS.

Witnesses:
W. G. BULLARD,
W. A. BROWN.